Sept. 30, 1941.    R. C. PIERCE    2,257,649
REINFORCING ELEMENT
Filed Nov. 18, 1939    2 Sheets-Sheet 1

INVENTOR.
ROBERT C. PIERCE
BY Booth & MacDuff
ATTORNEY.

Sept. 30, 1941.	R. C. PIERCE	2,257,649
REINFORCING ELEMENT
Filed Nov. 18, 1939	2 Sheets-Sheet 2

INVENTOR.
ROBERT C. PIERCE
BY Booth & MacDuff
ATTORNEY.

Patented Sept. 30, 1941

2,257,649

UNITED STATES PATENT OFFICE 2,257,649

REINFORCING ELEMENT

Robert C. Pierce, Niles, Mich., assignor to National Standard Company, Niles, Mich., a corporation of Michigan Application November 18, 1939, Serial No. 305,203

2 Claims. (Cl. 96—26)

This invention relates to reinforcing elements and method of making, and more particularly to the manufacture of reinforcing elements for articles of rubber or like plastic material.

One of tthe primary requirements for a reinforcing element for use in rubber articles is that a very strong bond be established between the rubber and the reinforcing element. Reinforcing elements of metal may be bonded chemically to rubber, and for some purposes this chemical bonding alone is sufficient; however, it is apt to break down under severe service conditions especially when it is subjected to heat.

It is accordingly one of the objects of the invention to provide a reinforcing element for rubber or like articles which is securely bonded to the rubber not only chemically, but also mechanically.

Another object of the invention is to provide a reinforcing element for rubber or like articles formed at least in part of metal wires. The metal wires provide high strength and a relatively high degree of flexibility, and may be so arranged as to be bonded both chemically and mechanically to the rubber.

Still another object of the invention is to provide a reinforcing element carrying bonding material to facilitate bonding thereof to the rubber. According to one important feature the reinforcing element is formed by strands of metal wire and of non-metallic yielding material with the latter strands carrying bonding material.

Still another object of the invention is to provide a reinforcing element made up primarily of metal and which is resilient in both tension and compression.

Other objects of the invention relate to a method of forming reinforcing elements which is simple and inexpensive, and at the same time rapid and economical.

Figure 1:
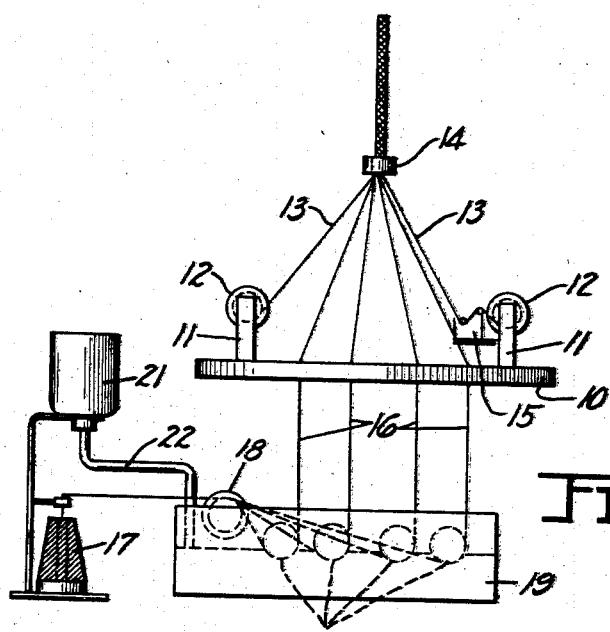

The above and other objects, advantages and novel features of the invention will be apparent from the following description when read in connection with the accompanying drawings, in which:

Figure 1 is a diagrammatic view illustrating a method according to the present invention; and Figures 2 to 7 are side views with parts in section illustrating various forms of reinforcing elements embodying the invention.

The several reinforcing elements illustrated are all made up of elongated strands at least some of which are metal wires associated together in the form of flat tapes.

Preferably the tapes include one or more strands of non-metallic yielding material, which carry bonding material.

Figure 1 illustrates diagrammatically a machine for carrying the method of the present invention, including, a guide plate 10 on which are movably arranged a series of carriers 11 carrying spools 12 of strand material. The carriers 11 travel back and forth in tracks on the guide plate 10 and alternately across each other so as to braid the strands coming therefrom, as is well understood in the art. The strands from the carriers indicated at 13, pass through a die 14 having an elongated opening therein through which the braid is drawn.

Figure 2:
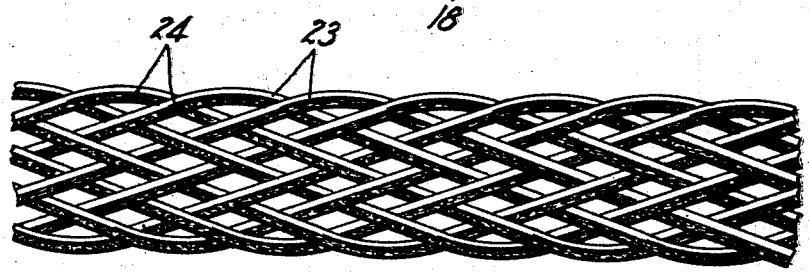
Figure 3:
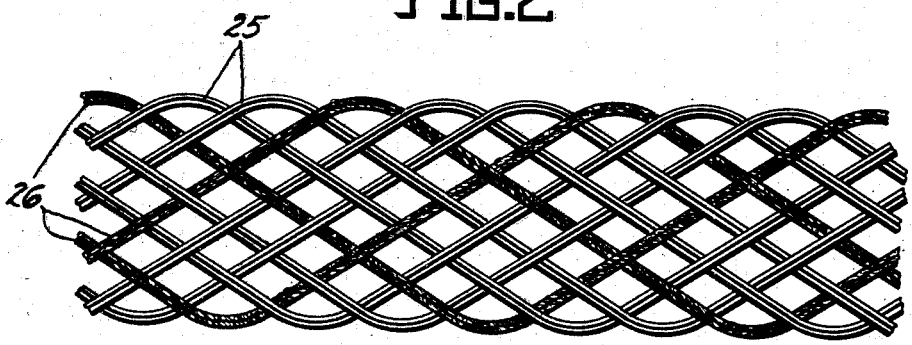
Figure 4:
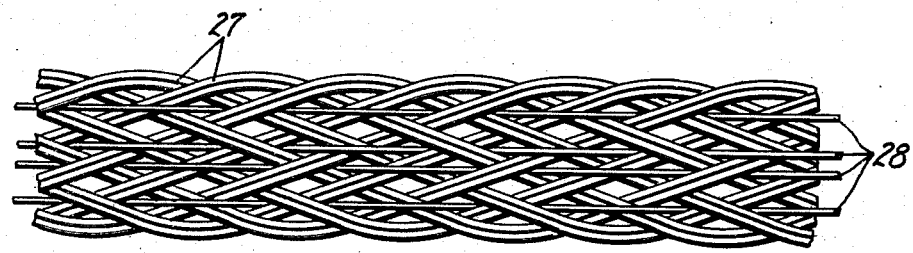

If it is desired that one or more of the strands 13 be of non-metallic material impregnated with bonding material, tanks 15 containing bonding material may be supported by the corresponding carriers 11, and may be provided with guide rollers over which the strand passes for leading it through the bonding material. To make a double braid, as shown in Figures 2, 3 and 4, a pair of strands is taken from each reel, and for a braid of the type shown in Figure 2, one strand of each pair is of non-metallic material and may be led through the tank 15 to be coated or impregnated with bonding material. As an alternative to pre-coating or pre-impregnating the non-metallic strands the braid may first be formed and the entire braid may then be dipped or sprayed with bonding material.

To make a braid of the type shown in Figure 4, additional strands 16 may be drawn from the supply spools 17 and led over pulleys 18 through bonding material in a tank 19. Bonding material may be supplied to the tank from a reservoir 21 having a feed pipe 22 terminating at the desired level. The pulleys 18 are so spaced that the strands 16 may pass up through the plate 10 between the guide tracks therein at such points as to be incorporated in the braid in the desired fashion.

The reinforcing element of Figure 2 comprises a braid such as might be formed according to the method shown in Figure 1, and including a plurality of pairs of strands crossing over and under each other diagonally back and forth across the braid. As shown, each strand crosses alternately over and then under two pairs of strands although it will be apparent that this might be varied to provide a braid of any desired character. One strand of each pair, as indicated at 23, is formed of a metal wire while the other strand of each pair 24 is of non-metallic yielding material. The metal wires are preferably high strength steel on the order of .006" in diameter, and coated with zinc and copper or with bonding lacquer to facilitate chemical bonding of the wires with the rubber. The non-metallic strands may be of rubber, synthetic rubber or like plastic or of fibrous material, such as cotton, hemp, linen, rayon, silk, wool, jute, or sisal. These strands are preferably coated or impregnated with bonding material such as latex or rubber cement to facilitate bonding of the rubber thereto. In the braid construction of Figure 2 some of the bonding material from each non-metallic strand will at least partially coat each of the metal wires, so that the wires will bond more readily to the rubber.

In using the reinforcing element of Figure 2 it may be calendared or molded into any desired rubber article. During vulcanizing or curing of the article, the rubber will bond chemically to the strands of the braid and will bond to itself around and between the strands and through the interstices of the braid. This will provide a very strong mechanical interlock between the braid and the rubber, in addition to the chemical bond between the rubber and the strand surfaces.

The reinforcing element is extremely flexible laterally and is at the same time resilient in both tension and compression. This is extremely useful in the case of rubber articles subjected to flexure or bending and permits the articles to be flexed without damage.

The braid of Figure 3 is quite similar to that of Figure 2 except that each of the strands of some of the pairs indicated at 25 is a metal wire while each strand of other pairs indicated at 26 is of non-metallic material. This braid has further been expanded widthwise to open up the spaces between the pairs of strands and to increase the sharpness of the bends in the strands at the edges of the braid. Due to the sharper bends in the strands the braid is more resilient in both tension and compression than that of Figure 2, and the larger spaces between the strands insure stronger mechanical bonding with the rubber.

Figure 4 illustrates a braid made up of pairs of metal wires 27 extending diagonally back and forth across the braid, and over and under each other. A plurality of strands 28, shown as four in number, extend lengthwise of the braid and cross alternately back and forth from top to bottom thereof, while remaining straight with respect to the side of the braid. The strands 28 may be metal wires or may be of non-metallic material carrying a bonding material, and are formed in the braid in the manner illustrated in Figure 1. The braid of Figure 4 may be placed in a rubber article in the same manner as the braids of Figures 2 and 3, and will bond to the rubber both chemically and mechanically in the same way.

Figure 5:

Figure 5 illustrates a flat tape made up of a plurality of metal wires 28 lying parallel to each other with non-metallic strands 31 parallel to and between them. The wires and strands are held together by a binding strand 32, which is preferably a metal wire and which extends diagonally back and forth across the width of the tape alternately over and under the wires and strands.

The non-metallic strands 31 are preferably coated or impregnated with bonding material which serves to cover, at least partially, the wires 29. When this tape is incorporated into a rubber article the rubber will bond chemically to the wires and strands, and will bond to itself around and between the wires and strands to form a secure bond.

This tape may be manufactured in a manner similar to the usual weaving operation by alternately raising and lowering the alternate strands, while feeding the binding wire 32 therebetween on a bobbin.

Figure 6:

Figure 6 illustrates another form of flat tape made up of parallel metal wires 33 with non-metallic strands 34 parallel to and between the wires. The wires and strands are bonded together by being imbedded in rubber or like material, indicated at 35, and the tape may be formed by feeding the wires lengthwise, while pressing the rubber material around them. The non-metallic strands 34, preferably carry bonding material to facilitate bonding of the rubber 35 to the several strands.

Figure 7:
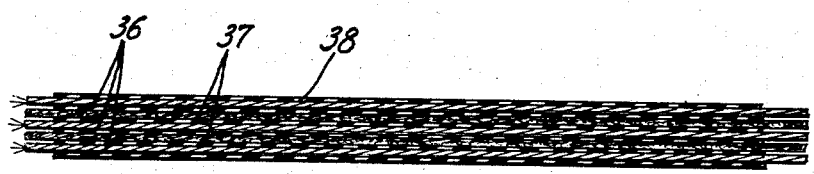

Figure 7 illustrates an element substantially similar to that of Figure 6 except that the metal wires 33 are replaced by strands 36 formed of a plurality of metal wires twisted together. Between the strands 36 are arranged non-metallic strands 37, and the several strands are bonded together by a body of rubber or the like, indicated at 38.

While several embodiments of the invention have been shown and described in detail, and while several methods of carrying out the invention have likewise been described it is to be understood that the illustrations and detailed description are not to be taken as a definition of the scope of the invention, reference being had for this purpose to the appended claims.

What is claimed is:

1. A reinforcing element for rubber or like articles comprising a flat tape formed of a plurality of elongated relatively thin strands of substantially the same diameter, each extending diagonally back and forth across the width of the tape over and under other strands to form a braid, at least one of said strands being of non-metallic yielding material and the other strands being formed of metal wires said tape being resilient longitudinally to yield during flexing of a reinforced article, said non-metallic strands carrying bonding material to facilitate bonding the reinforcing elements to rubber.

2. A reinforcing element for rubber or like articles comprising a flat braid formed of strands each extending diagonally back and forth across the width of the braid and over and under other strands, said braid being spread widthwise to open up the spaces between the strands and so that the strands have relative sharp bends at the edges of the braid to increase the resilience of the braid, some of said strands being of non-metallic yielding material and the other strands being metal wires said braid being longitudinally resilient to yield during flexing of a reinforced article.

ROBERT C. PIERCE.